United States Patent [19]
Ueda

[11] Patent Number: 5,748,898
[45] Date of Patent: May 5, 1998

[54] IMAGE DATA COMMUNICATION SYSTEM

[75] Inventor: Hiroaki Ueda, Tokyo, Japan

[73] Assignee: NEC Corporation, Tokyo, Japan

[21] Appl. No.: 695,415

[22] Filed: Aug. 12, 1996

[30] Foreign Application Priority Data

Aug. 10, 1995 [JP] Japan ............................... 7-224570

[51] Int. Cl.⁶ ........................................................ H04N 7/173
[52] U.S. Cl. ........................... 395/200.49; 348/7; 455/4.2
[58] Field of Search ............................ 348/12, 13, 7, 348/6, 10, 14, 15, 16, 17, 18, 19; 455/4.2, 5.1, 6.1, 6.2, 6.3; 395/200.49, 200.48, 200.47, 200.34, 200.33, 200.36, 200.31; H04N 7/16, 7/173

[56] References Cited

U.S. PATENT DOCUMENTS

| | | | |
|---|---|---|---|
| 4,958,278 | 9/1990 | Meguro | 395/200.49 |
| 5,561,456 | 10/1996 | Yu | 348/7 |
| 5,629,732 | 5/1997 | Moskowitz et al. | 348/7 |
| 5,652,614 | 7/1997 | Okabayashi | 348/7 |

FOREIGN PATENT DOCUMENTS 5-83259 4/1993 Japan.
5-258026 10/1993 Japan.
5-274398 10/1993 Japan.

*Primary Examiner*—Christopher C. Grant
*Attorney, Agent, or Firm*—Foley & Lardner

[57] ABSTRACT

The invention provides an image data communication system of a simple construction wherein wasteful processing is eliminated so that desired image data can be transmitted rapidly to a terminal of a source of a request for the image data. A server and a plurality of terminals are interconnected so as to allow communication of image data. A terminal information retrieval section provided in the server discriminates whether or not image data requested from a first terminal have already been transmitted to a second terminal. An image data transfer section provided in the server requests, when a result of the discrimination is that the data have been transmitted already, the second terminal for transmission of the image data and transfers the image data received from the second terminal to the first terminal. A terminal memory provided in each terminal stores image data, and an image data transmission section provided in each terminal reads out image data requested from the server from the terminal memory and transmits the read out image data to the server.

4 Claims, 10 Drawing Sheets

FIG. 2

| R_Leng | R_Addr | R_Data | | | R_Addr | | | ns
IMAGE DATA COMMUNICATION SYSTEM

BACKGROUND OF THE INVENTION

1. Field of the Invention

This invention relates to an image communication system wherein image data are communicated between a server and a plurality of terminals in order to reproduce desired image data by a terminal.

2. Description of the Related Art

In order to transmit an image via a communication line, the image is digitized. However, since the amount of data of an image is very large, the image is usually compressed and coded in accordance with a compression coding method standardized by the JPEG (Joint Photographic Expert Group) or the MPEG (Moving Pictures Expert Group). Such compression coding methods are applied, for example, to a TV conference system, a CATV (Cable TV) system, to a VOD (Video on Demand) system.

Reproduction of image information by conventional bi-directional communications will be described. FIG. 10 shows in block diagram a conventional moving picture reproduction system.

Referring to FIG. 1, the moving picture reproduction system shown includes a server 1, and a terminal 3 which bi-directionally communicates with the server 1 via a line 2.

The server 1 includes a server controller 4, a server communication section 5, a server memory 6, and a storage section 7 in which a plurality of image data (moving picture codes) are stored as an image data file 7a. Meanwhile, the terminal 3 includes a terminal controller 8, a keyboard 9, a terminal communication section 10, a terminal memory 11 and a decoding section 12.

In the moving picture reproduction system, desired image data are selected using the keyboard 9 of the terminal 3, and a request for transmission of the image data is issued from the terminal 3 to the server 1. The server 1 retrieves and reads in the requested image data from the image data file 7a and sends the image data to the terminal 3. In the terminal 3, the received image data are decoded and reproduced by the decoding section 12.

In a moving picture reproduction system of the type described above, where a plurality of terminals are involved, since an image data request from each terminal is sent to the single server, it sometimes occurs that transmission requests for the same image data are sent to the server within a short period of time. In this instance, since processing of retrieving and reading in the same image data from the image data file 7a is repeated, the moving picture reproduction system has a drawback in that the server must perform wasteful processing.

One of improved systems which eliminates the drawback just described is disclosed in Japanese Patent Laid-Open Application No. Heisei 5-83259. In the improved system, two local area networks (LANs) are interconnected such that, when a terminal of a first one of the LANs is utilized to communicate data between two servers of the second LAN, a virtual line is established between the servers of the second LAN in response to the request from the terminal of the first LAN so that data are directly communicated via the virtual line in order to perform transfer processing rapidly eliminating such wasteful processing as described above. However, the system just described is disadvantageous in that, since a virtual line must be established, it is complicated in construction.

Another improved system is disclosed in Japanese Patent Laid-Open Application No. Heisei 5-258026 and Japanese Patent Laid-Open Application No. Heisei 5-274398. In the second-mentioned improved system, a single program for performing image processing and transfer and a plurality of programs indicating the single program are executed to transfer a large number of image data without communications between applications. With the system just described, however, since a plurality of programs must be executed simultaneously, apparatus of a high performance are required.

SUMMARY OF THE INVENTION

It is an object of the present invention to provide an image data communication system of a simple construction wherein wasteful processing is eliminated so that desired image data can be transmitted rapidly to a terminal of a source of a request for the image data.

In order to attain the object described above, according to the present invention, there is provided an image data communication system which includes a server and a plurality of terminals and wherein image data are communicated between the server and terminals, comprising transmission discrimination means provided in the server for discriminating whether or not image data requested from a first one of the terminals have already been transmitted to a second one of the terminals, image data transfer means provided in the server for requesting, when a result of the discrimination of the transmission discrimination means is that the data have been transmitted already, the second terminal for transmission of the image data and transferring the image data received from the second terminal to the first terminal, terminal side storage means provided in each of the terminals for storing image data, and image data transmission means provided in each of the terminals for reading out image data requested from the server from the terminal side storage means and transmitting the read out image data to the server.

Preferably, the image data communication system further comprises server side storage means provided in the server for storing a terminal information file including an address number of the second terminal and a name of the image data transmitted to the second terminal and an image data file including a plurality of image data, the transmission discrimination means referring to the terminal information file to discriminate to which one of the terminals the image data have been transmitted.

Preferably, image data are transferred as packet data together with an address number of a destination and an address number of a source of transmission.

Preferably, the image data communication system further comprises a router for transmitting the image data toward the terminal of the destination based on the address number of the destination included in the packet data.

With the image data transmission system, when transmission requests for the same image data are received from a plurality of terminals, the server need not repeat the same retrieval operation, and the image data can be transferred from the second terminal side via the server to the first terminal which is the source of the request for the image data. Consequently, the desired image data can be transferred rapidly to the terminal of the source of the request while the image data transmission system is simple in construction.

Further, since image data stored in the terminal side storage means are utilized, a storage device of the server side including the server side storage means can be utilized effectively.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 2 is a diagram illustrating a format of packet data used in the image data communication system of FIG. 1;

DESCRIPTION OF THE PREFERRED EMBODIMENT

Figure 1:
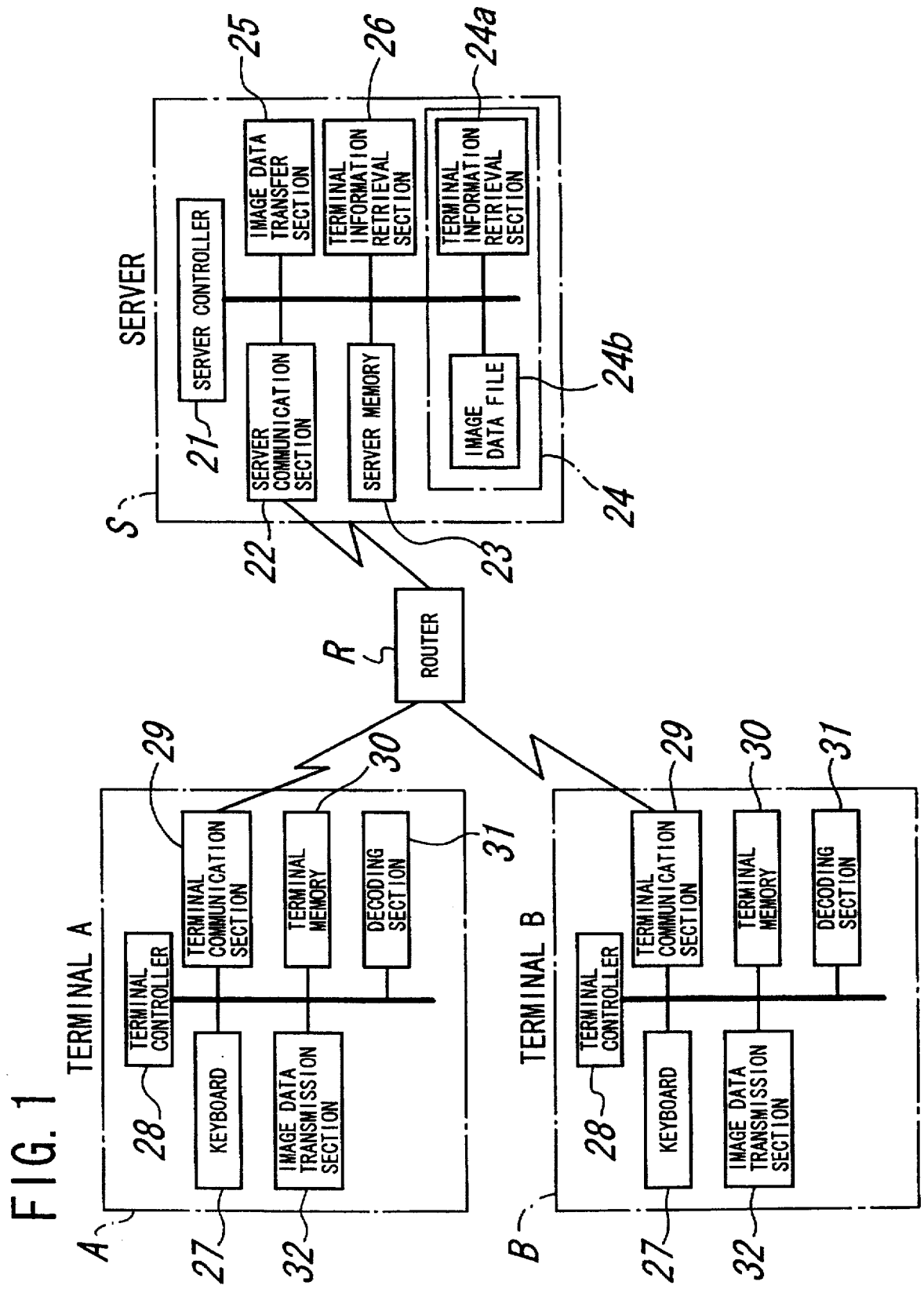
FIG. 1 is a block diagram of an image data communication system showing a preferred embodiment of the present invention.

Referring first to FIG. 1, there is shown in block diagram an image data communication system to which the present invention is applied. For convenience of illustration and description, the image data communication system of FIG. 1 is shown including only two terminals.

The image data communication system includes a server S, a pair of terminals A and B, and a router R which serves as a repeater. In the image communication system, packet data are bi-directionally communicated between the server S and the terminals A and B and between the terminals via the router R.

The server S includes a server controller 21 for controlling the entire server S, a server communication section 22 for communicating with the terminals A and B, a server memory 23 for storing a value of a variable used during operation of the server S or temporarily storing image data, a storage section 24 formed from a hard disk or a like element, an image data transfer section 25, and a terminal information retrieval section 26.

The storage section 24 includes a terminal information file 24a in which terminal information of a destination of image data is described, and an image data file 24b which includes a plurality of image data.

Figure 2:
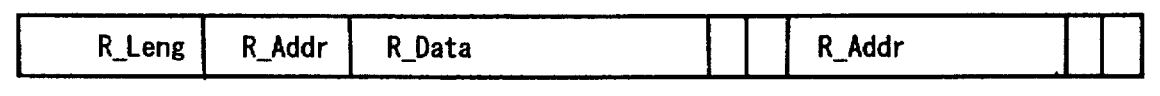

Referring to FIG. 2, the terminal information file 24a includes a quantity (R_Leng) of terminal information, an address number (R_Addr) of a terminal and a name (R_Data) of image data having been sent to the terminal.

Figure 3:
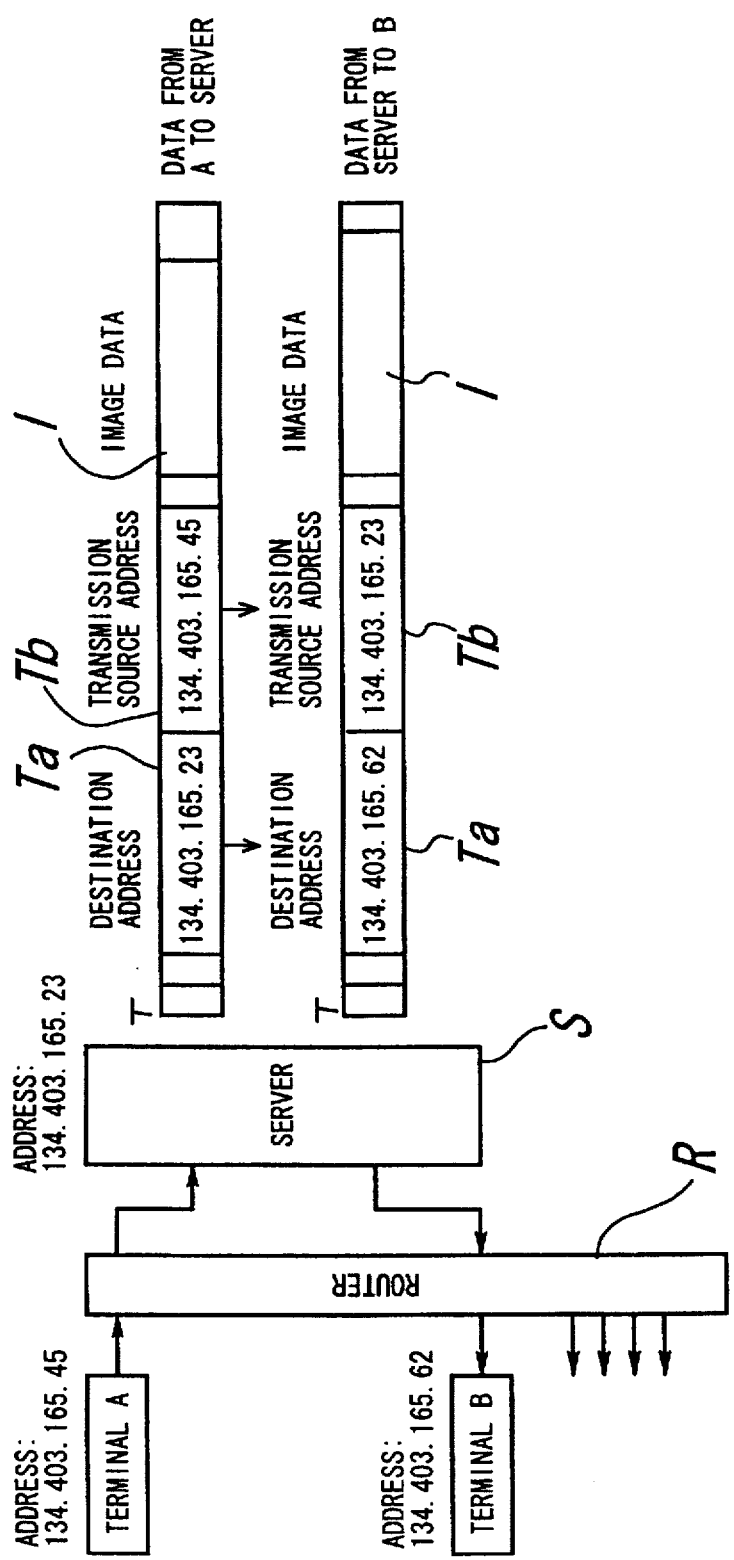
FIG. 3 is a flow diagram showing a flow of data when packet data are transferred in the image data communication system of FIG. 1.

FIG. 3 illustrates a flow of packet data transferred via the router R. Referring to FIG. 3, packet data T represents data from a terminal to the server while packet data T' represents data from the server to another terminal. The format of the data includes an address number Ta of a destination, an address number Tb of a source of transmission, coded image data I and so forth. The address numbers Ta and Tb are described, for example, like 134:403:165:23 (server), 134:403:165:62 (terminal B) and 134:403:165:45 (terminal A).

The terminal information retrieval section 26 has a function as transmission discrimination means for referring, when a request for transmission of particular image data is received from one of the terminals, to the terminal information file 24a to discriminate whether or not the image data have been transmitted already to any other terminal.

The image data transfer section 25 has a function of reading out, when image data requested to transmit from one of the terminals have not been transmitted as yet, the image data from the terminal information file 24a and transmitting the image data to the terminal from which the request for transmission was received, but issuing, when the image data have been transmitted already, to the terminal to which the image data have been transmitted, a request for transmission of the image data and transmitting the image data received from the terminal in response to the request as packet data to the terminal of the source of the request for transmission and has another function of modifying an address number of such packet data.

For example, it is assumed to transfer the packet data T from the terminal A to the terminal B. In this instance, the image data transfer section 25 of the server S modifies the destination address number Ta of the packet data T from 134:403:165:23 (server) to 134:403:165:62 (terminal B) and further modifies the transmission source address Tb 134:403:165:45 (terminal A) to 134:403:165:23 (server S). The packet data T' are obtained by the modification.

When the packet data T' whose address numbers have been modified in such a manner as described above are transmitted to the router R, the router R transmits the packet data T' to the terminal B based on the destination address number of the packet data T'. By modifying the address numbers in this manner, the image data which have been transmitted to the terminal A can be transferred to the terminal B.

The terminals A and B are constructed in the following manner.

Each of the terminals A and B includes a keyboard 27 for inputting a choice of a user, a terminal controller 28 for controlling the entire terminal, a terminal communication section 29 for communicating with the server S, a terminal memory 30 for storing a value of a variable used in operation, image data and so forth, a decoding section 31 for decoding image data, and an image data transmission section 32.

The image data transmission section 32 has a function of transmitting image data stored in the terminal memory 30 as packet data in response to a request from the server S.

The router R repeats packet data sent out from the server S or the terminal A or B to a terminal or the server S specified by the address number of the destination included in the packet data.

Figure 4:
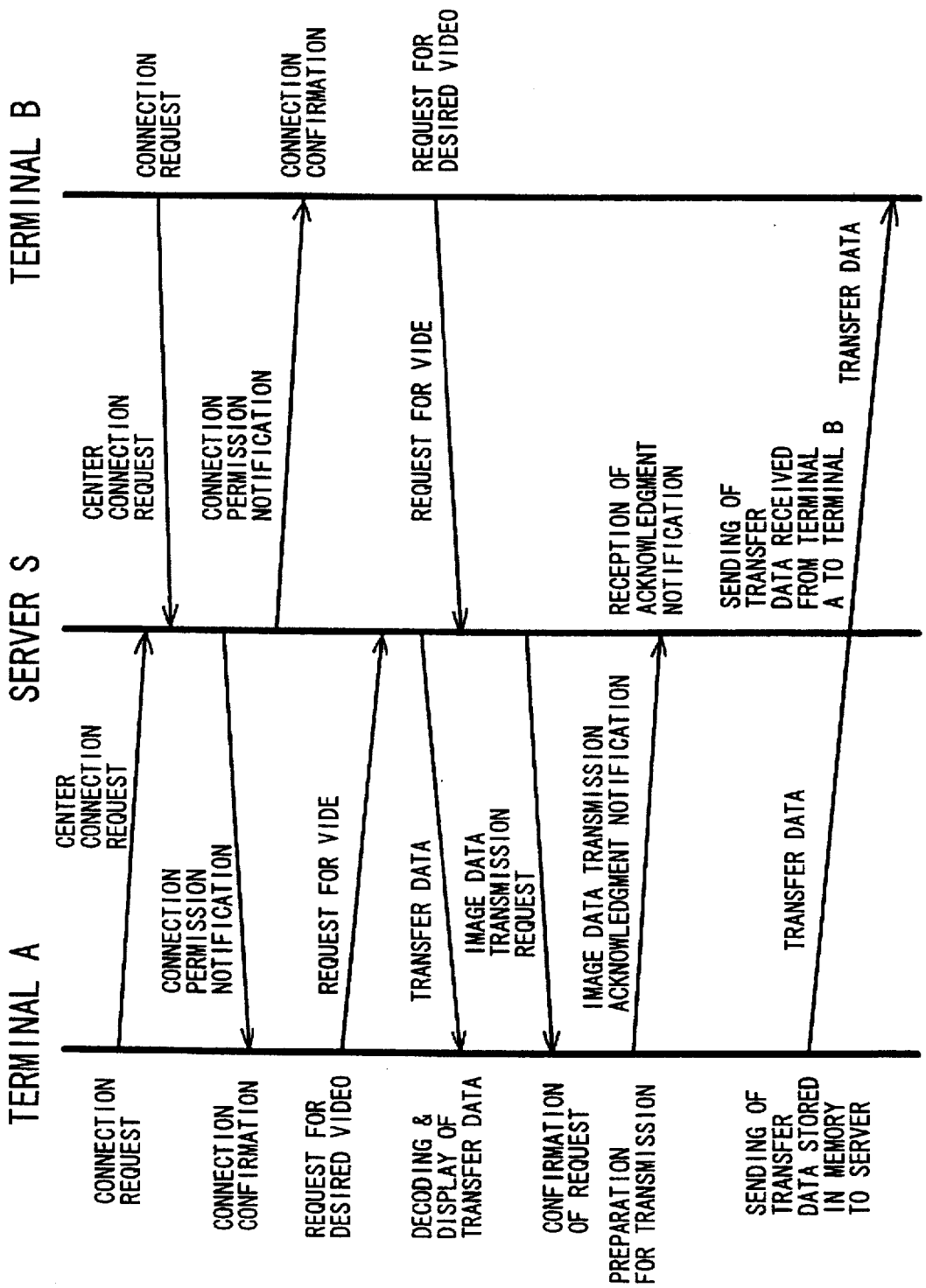
FIG. 4 is a diagram illustrating a sequence of operations between terminals and a server in the image data communication system of FIG. 1.

Communications of packet data between the terminals A and B and the server S will be described with reference to FIGS. 3 and 4. It is assumed that, in the sequence illustrated in FIG. 4, a request for image data to the server S is issued first from the terminal A and then from the terminal B, and image data requested of the server S from the terminals A and B are the same as each other.

After a request for connection is received from the terminal A, if another request for connection (center connection request) is received from the terminal B, then the server S first transmits a connection permission notification to the terminal A and then transmits another connection permission notification to the terminal B.

The terminal A confirms the connection based on reception of the connection permission notification from the server S and transmits a request for desired image data (video request). Then, the terminal B confirms the connection based on reception of the connection permission notification from the server S and then transmits a request for desired image data.

The server S retrieves the image data requested from the terminal A from the image data file 24b and transmits the retrieved image data as packet data to the terminal A. The terminal A thus receives and decodes the packet data to reproduce the data.

On the other hand, since the image data requested from the terminal B are the same data as the data which have been transmitted to the terminal A, the server S requests the terminal A for transmission of the image data. After confirmation of the request, the terminal A makes preparations for transmission and transmits a transmission acknowledgment notification of the image data to the server S.

Thereafter, packet data including the requested image data are transmitted from the terminal A to the server S. The server S modifies the address number of the destination included in the packet data in such a manner as seen in FIG. 3 and transmits the modified packet data to the terminal B. The terminal B thus decodes the image data included in the packet data to reproduce the data.

Figure 5:
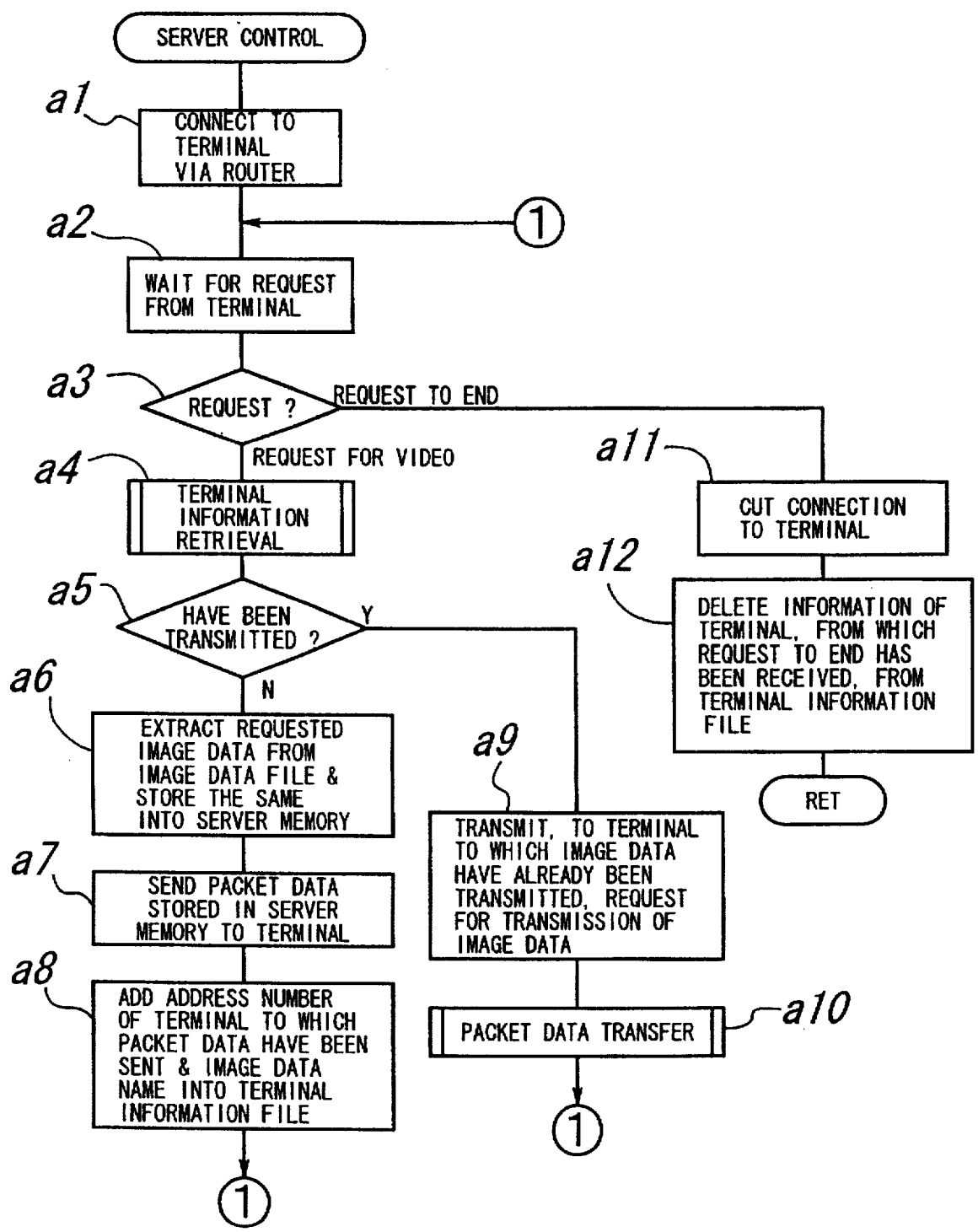
FIG. 5 is a flow chart illustrating a processing procedure of a server controller shown in FIG. 1.
Figure 6:
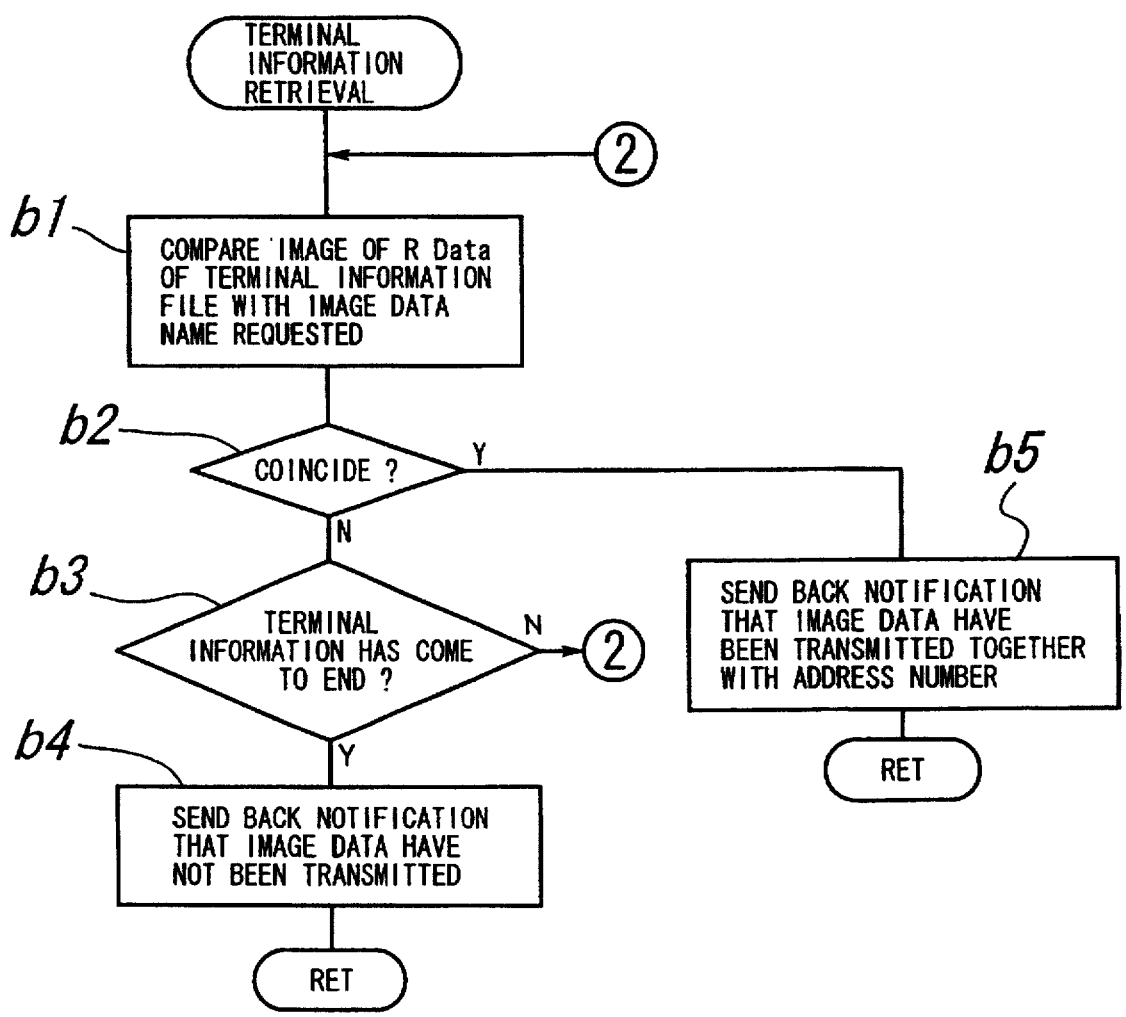
FIG. 6 is a flow chart illustrating a processing procedure of terminal information retrieval executed in the procedure of FIG. 5.

Subsequently, detailed processing operation of the server S will be described with reference to FIGS. 5 to 7. FIG. 5 illustrates processing operation of the server controller 21, and FIG. 6 illustrates detailed processing of terminal information retrieval included in the procedure of FIG. 5. It is to be noted that, while the following description given with reference to FIGS. 5 to 7 proceeds in such a manner that the server controller 21 itself performs some processing, actually the processing may be performed by a component of the server S having a corresponding function under the control of the sever controller 21.

Step a1: the server controller 21 controls the server communication section 22 to connect to the terminal A via the router R.

Step a2: the server controller 21 waits until a request from the terminal A is received by the server communication section 22.

Step a3: if the request received from the terminal A is a request for image data, the server controller 21 advances the control sequence to step a4, but if the request is a request to end, then the server controller 21 advances the control sequence to step a11.

Step a4: the server controller 21 refers to the terminal information file 24a to perform retrieval of terminal information.

Step a5: the server controller 21 discriminates from a result of the retrieval whether or not the image data have been transmitted already, and if the image data have not been transmitted, then the server controller 21 advances the control sequence to step a6, but if the image data have been transmitted already, then the server controller 21 advances the control sequence to step a9.

Step a6: the server controller 21 extracts the requested image data from the image data file 24b and stores the image data into the server memory 23.

Step a7: the server controller 21 sends packet data including the image data stored in the server memory 23 to the terminal A.

Step a8: the server controller 21 additionally describes an address number of the terminal A of the destination and a data name of the image data into the terminal information file 24a, and then, the server controller 21 returns the control sequence to step a2.

When it is discriminated in step a5 that the image data have been transmitted already, the following steps are executed subsequently.

Step a9: the server controller 21 transmits, to the terminal A to which the image data have already been transmitted, a request for transmission of the image data from the server communication section 22.

Step a10: the server controller 21 transfers the received image data as packet data to the terminal B, and then the server controller 21 returns the control sequence to step a2.

When it is discriminated in step a3 that the request received from the terminal A is a request to end, the following steps are executed subsequently.

Step a11: the server controller 21 cuts the connection to the terminal.

Step a12: the server controller 21 deletes the information of the terminal, from which the request to end has been received, from the terminal information file 24a.

Subsequently, details of the terminal information retrieval executed in step a4 of the procedure of FIG. 5 will be described with reference to the flow chart of FIG. 6.

Step b1: the server controller 21 compares the image data name R_Data of the terminal information file with the image data name requested from the terminal A.

Step b2: the server controller 21 discriminates whether or not the image data names coincide with each other, and if they do not coincide with each other, then the server controller 21 advances the control sequence to step b3, but if they coincide with each other, then the server controller 21 advances the control sequence to step b5.

Step b3: the server controller 21 discriminates whether or not the terminal information has come to an end, and if the terminal information has come to an end, then the control sequence advances to step b4, but if the terminal information has not come to an end, then the server controller 21 returns the control sequence to step b1.

Step b4: the server controller 21 sends back a notification that the image data have not been transmitted as yet.

When it is discriminated in step b2 that the compared image data names coincide with each other, the following processing is performed.

Step b5: the server controller 21 sends back another notification that the image data have been transmitted already together with the address number (R_Addr) of the terminal of the destination.

Figure 7:
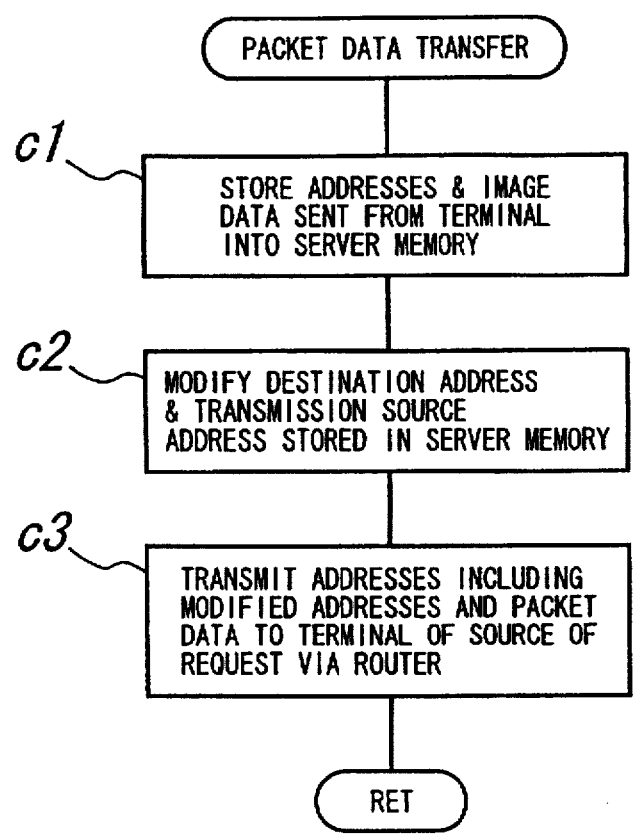
FIG. 7 is a flow chart illustrating a processing procedure for transfer of packet data executed in the procedure of FIG. 5.

FIG. 7 illustrates detailed processing of the image data transfer executed in step a10 of the processing of FIG. 5 described hereinabove.

Step c1: the server controller 21 stores the destination and transmission source address numbers and the image data from the terminal A received by the server communication section 22 into the server memory 23.

Step c2: the server controller 21 modifies the destination address number and the transmission source address number stored in the server memory 23.

Step c3: the server controller 21 transmits packet data including the modified address numbers and the image data from the server communication section 22 to the terminal B of the source of the request via the router R.

Figure 8:
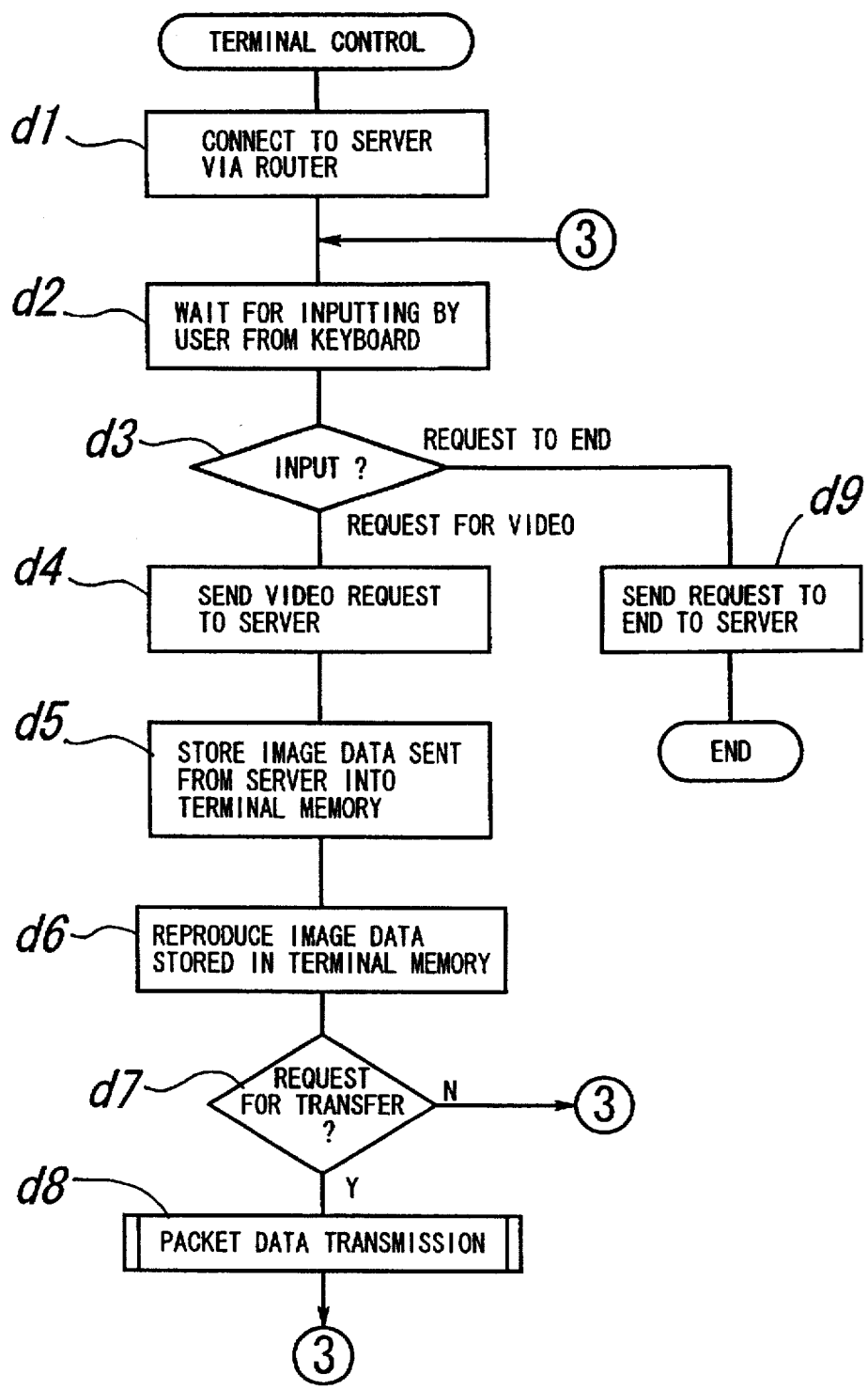
FIG. 8 is a flow chart illustrating a proceeding procedure of a terminal control shown in FIG. 1.

Subsequently, detailed processing operation of each of the terminals A and B will be described with reference to FIG. 8 which illustrates processing operation of the terminal controller 28 of a terminal. It is to be noted that, while the following description given with reference to FIGS. 8 and 9 proceeds in such a manner that the terminal controller 28 itself performs some processing, actually the processing may be performed by a component of the terminal A or B having a corresponding function under the control of the terminal controller 28.

Step d1: the terminal controller 28 controls the by the terminal communication section 29 to connect to the server S via the router R.

Step d2: the terminal controller 28 waits for inputting of a request from the keyboard 18.

Step d3: the terminal controller 28 discriminates whether or not an inputted request is received, and if a request for image data is received, then the terminal controller 28 advances the control sequence advances step d4, but if a request to end is received, then the terminal controller 28 advances the control sequence to step d9.

Step d4: the terminal controller 28 transmits a request for image data to the server S via the terminal communication section 20.

Step d5: the terminal controller 28 stores image data from the server S received by the terminal communication section 29 into the terminal memory 30.

Step d6: the terminal controller 28 decodes the image data stored in the terminal memory 30 by the decoding section 31.

Step d7: the terminal controller 28 discriminates whether or not a request for transfer has been received, and if a request for transfer has been received, then the terminal controller 28 advances the control sequence to step d8, but if no request for transfer has been received, then the terminal controller 28 returns the control sequence to step d2.

Step d8: the terminal controller 28 transmits packet data including the image data.

When it is discriminated in step d3 that a request to end is received, the following processing is performed.

Step d9: the terminal controller 28 transmits a request to end from the terminal communication section 29 to the server S.

Figure 9:
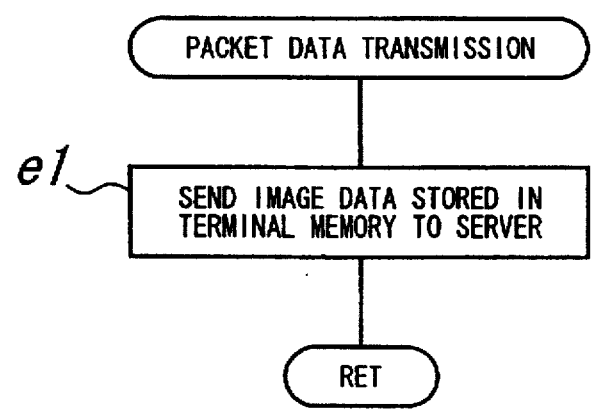
FIG. 9 is a flow chart illustrating a processing procedure of packet data transmission executed in the procedure of FIG. 8.
Figure 10:
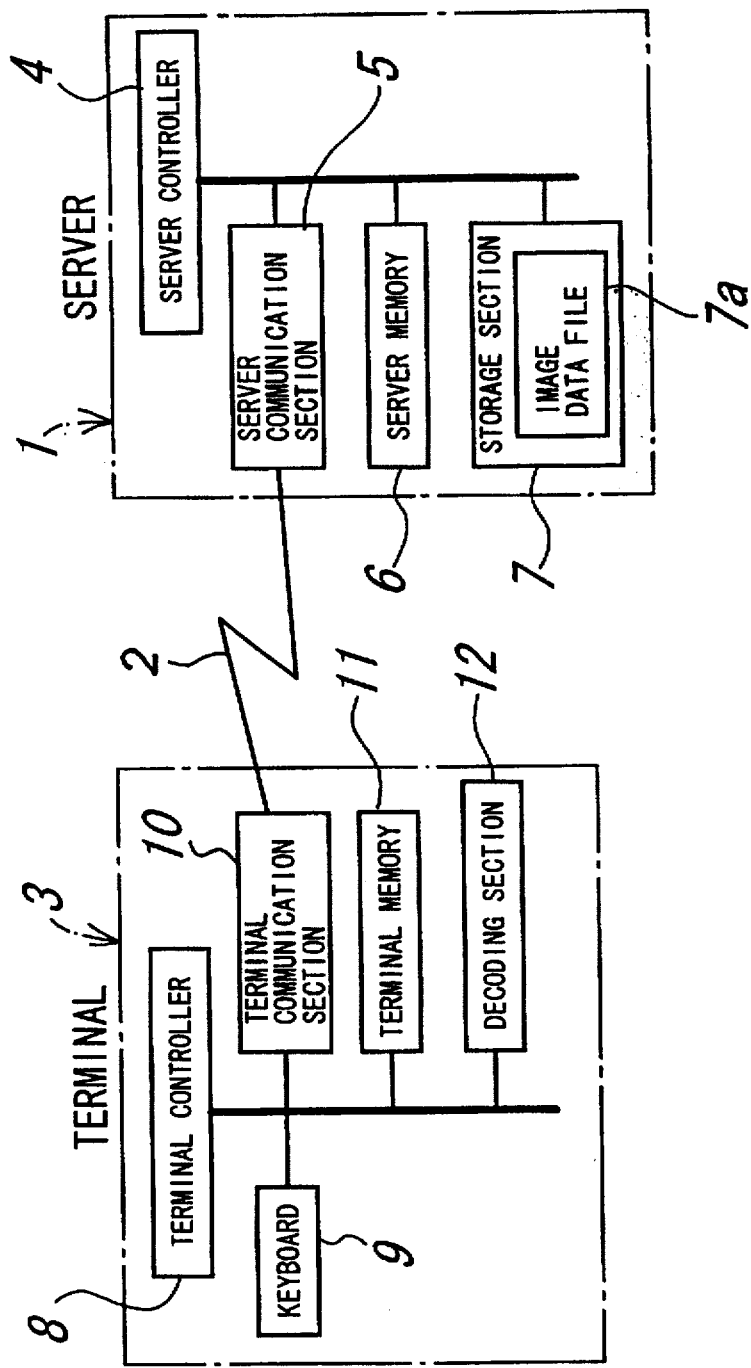
FIG. 10 is a block diagram showing a conventional image data communication system.

Details of the packet data transmission processing executed in step d8 of the procedure of FIG. 8 will be described with reference to FIG. 9.

Step e1: the terminal controller 28 transmits the image data stored in the terminal memory 30 as packet data from the terminal communication section 29 to the server S.

Having now fully described the invention, it will be apparent to one of ordinary skill in the art that many changes and modifications can be made thereto without departing from the spirit and scope of the invention as set forth herein.

What is claimed is:

1. An image data communication system which includes a server and a plurality of terminals and wherein image data are communicated between said server and said terminals, comprising:

transmission discrimination means provided in said server for discriminating whether or not image data requested from a first one of said terminals have already been transmitted to a second one of said terminals;

image data transfer means provided in said server for requesting, when a result of the discrimination of said transmission discrimination means is that the data have been transmitted already, the second terminal for transmission of the image data and transferring the image data received from the second terminal to the first terminal;

terminal side storage means provided in each of said terminals for storing image data; and image data transmission means provided in each of said terminals for reading out image data requested from said server from each of said terminal side storage means and transmitting the read out image data to said server.

2. An image data communication system as claimed in claim 1, further comprising server side storage means provided in said server for storing a terminal information file including an address number of the second terminal and a name of the image data transmitted to the second terminal and an image data file including a plurality of image data, said transmission discrimination means referring to said terminal information file to discriminate to which one of said terminals the image data have been transmitted.

3. An image data communication system as claimed in claim 2, wherein image data are transferred as packet data together with an address number of a destination and an address number of a source of transmission.

4. An image data communication system as claimed in claim 3, further comprising a router for transmitting the image data toward the terminal of the destination based on the address number of the destination included in the packet data.

* * * * *